(12) United States Patent
Bayne

(10) Patent No.: US 7,876,887 B2
(45) Date of Patent: Jan. 25, 2011

(54) SELECTIVELY ADDING A THIRD PARTY TO A COLLECT CALL

(76) Inventor: Anthony Jeremiah Bayne, 25315 Andreo Ave., Lomita, CA (US) 90717

( * ) Notice: Subject to any disclaimer, the term of this patent is extended or adjusted under 35 U.S.C. 154(b) by 1104 days.

(21) Appl. No.: 11/537,591

(22) Filed: Nov. 17, 2006

(65) Prior Publication Data
US 2008/0063163 A1 Mar. 13, 2008

Related U.S. Application Data

(60) Provisional application No. 60/840,118, filed on Aug. 25, 2006.

(51) Int. Cl.
*H04M 15/00* (2006.01)
(52) U.S. Cl. .................. 379/114.21; 379/114.05; 379/114.23
(58) Field of Classification Search ........... 379/114.01, 379/114.05, 114.19, 114.2, 114.21, 114.23, 379/114.24, 202.01, 207.01
See application file for complete search history.

(56) References Cited

U.S. PATENT DOCUMENTS

| 6,795,540 | B1 * | 9/2004 | Mow | 379/188 |
|---|---|---|---|---|
| 2002/0071537 | A1 * | 6/2002 | Gainsboro | 379/188 |
| 2003/0076940 | A1 * | 4/2003 | Manto | 379/114.05 |
| 2003/0086546 | A1 * | 5/2003 | Falcone et al. | 379/114.21 |
| 2005/0014491 | A1 * | 1/2005 | Johnson | 455/417 |
| 2006/0286962 | A1 | 12/2006 | Davis | |
| 2007/0116214 | A1 * | 5/2007 | Kitchin et al. | 379/111 |

* cited by examiner

*Primary Examiner*—Quoc D Tran

(57) ABSTRACT

Prior to establishing a collect call, the called party agrees to pay an additional fee for any three-way call that may be established during the proposed collect call. If during the collect call, the called party attempts to add a third party to the collect call, a call processing system determines whether the third party's phone number is blocked from accepting a collect call. If the third party's phone number is blocked from accepting a collect call, the number will be dialed in an attempt to establish a three-way call. If the third person's phone number is not blocked from accepting a collect call, the called party to the original collect call will be advised that the phone number entered is not eligible for three-ways calling during the collect call, and the parties to the original collect call will be reconnected. If the original collect call originates from a custodial facility, the call processing system may additionally verify that that the original calling party is not disallowed from dialing any entered number, including the original called party's phone number and any subsequent third party's phone number that may be entered by the original called party, prior to the call processing system dialing said number(s). Service providers, by selectively allowing a three-way call during a collect call, to add a third party whose phone line is blocked from accepting a collect call, will earn revenues from communications that may never otherwise take place.

7 Claims, 3 Drawing Sheets

SELECTIVELY ADDING A THIRD PARTY TO A COLLECT CALL

RELATED APPLICATIONS

The present application claims the benefit of U.S. Provisional Patent Application Ser. No. 60/840,118, filed Aug. 25, 2006, which is hereby incorporated by reference as if set forth fully herein.

TECHNICAL FIELD

The present invention relates generally to the adding of a third party to a collect call in a telecommunication system. More particularly, the present invention relates to systems and methods for selectively providing communications between a party making a collect call and a person whose phone number is restricted ("blocked") from accepting collect calls through specialized three-way calling.

BACKGROUND OF THE INVENTION

Many initiators of a collect call (hereinafter "Calling Party No. 1") will ask the person who accepts the collect call (hereinafter "Called Party No. 1") to add a $3^{rd}$ party (hereinafter "3rd Party) to the collect call in progress, making it a "three-way" or "conference call". Three-way calling is usually accomplished by placing a party to a call on hold, pressing the receiver (hook switch) to get a dial tone, calling the next participant, and if the next participant answers, pressing the receiver again to connect all three persons.

The usual reason for this request, when Calling Party No. 1 has called Called Party No. 1 collect, is that Calling Party No. 1 has insufficient money to call 3rd Party directly, or 3rd Party's phone cannot accept collect calls ("blocked"). If the three-way call is established, Called Party No. 1 will continue to be billed for the call as long as the call continues. If Called Party No. 1 hangs-up the phone, it will usually terminate the connection between Calling Party No. 1 and 3rd Party.

A common scenario for this occurrence is when Calling Party No. 1 is an inmate who makes a collect call to his attorney (Called Party No. 1) who accepts the call. During the collect call, Calling Party No. 1 requests that the attorney add a family member of the inmate to the call, by making the collect call a three-way call. It is well known that penal facilities are largely filled with poor people. The families of these inmates are often poor also, and may have their phones blocked from receiving collect calls, or only have a mobile phone that cannot accept collect calls. Inmates are almost exclusively limited to making collect calls. Therefore, there remains a need for an improved channel of communication between inmates and their families, so as to ease the financial burdens normally placed on the families of inmates.

Additionally, phone service providers who service custodial facilities use equipment ("control boxes") to detect attempted three-way calls and may disconnect any call in progress between Calling Party No. 1 and Called Party No. 1 if a three-way call attempt is detected. As an example, the control box may detect any hook switch being depressed for setting up the three-way call. This is done for security purposes, to prevent inmates from calling persons that they have been ordered by the court not to contact (e.g. victim).

Further, if a three-way call is established during a collect call, the phone service provider, and the facility it shares a commission with, loses the collect call set up fee, pay phone use charge and the most costly $1^{st}$ minute of talk time. The problem with terminating all attempted three-way calls is that many times there is no legal or administrative reason to prevent Calling Party No. 1 from contacting 3rd Party, but only an economic one, namely 3rd Party has a blocked phone that cannot conveniently accept a collect call from Calling Party No. 1. However, if Called Party No. 1 was selectively allowed to add a 3rd Party to the collect call, Calling Party No. 1 would talk longer and the service provider would earn more income. Therefore, there remains a need to avoid "throwing the baby out with the bath water" and selectively allow the addition of a third party to a collect call that will support public safety goals (in those cases where Calling Party No. 1 is in custody) and allow the service provider to earn money that they would otherwise miss.

SUMMARY OF THE INVENTION

In a non-custody setting, the present invention meets the above-described needs by allowing Called Party No. 1 to add persons (make a three-way call) to an ongoing collect call, if the proposed phone number of 3rd Party is blocked from accepting collect calls, and/or Called Party No. 1 agrees (at original collect call setup, when attempting to place a three-way call, or both) to pay additional three-way calling fees (e.g. additional fees that may equal the collect call set up fees and $1^{st}$ minute of call). By limiting three-way calling to include only a 3rd party whose phone is blocked, even if the service provider chooses to forgo an additional three-way fee, the service provider will earn income that they otherwise would have missed, because the $3^{rd}$ Party is unable to accept a collect call from Calling Party No. 1.

In certain aspects, the invention provides systems and methods for processing a collect call placed by an inmate (Calling Party No. 1) from a custodial facility using a custodial facility phone. Where Calling Party No. 1 is in custody, the invention may additionally screen Called Party No. 1's phone number and any subsequent phone number entered by Called Party No. 1 to verify that any phone number entered is not on a Do Not Call database for Calling Party No. 1, and may request some affirmative response (e.g. say "yes", press #, etc.) from any 3rd Party subsequently dialed by Called Party No. 1, to insure that 3rd Party desires to speak to Calling Party No. 1 before connecting the attempted three-way call.

These and other features, aspect and embodiments of the invention will be described in more detail below.

BRIEF DESCRIPTION OF THE DRAWINGS

FIG. 2, comprising

DETAILED DESCRIPTION OF THE INVENTION

Figure 1:
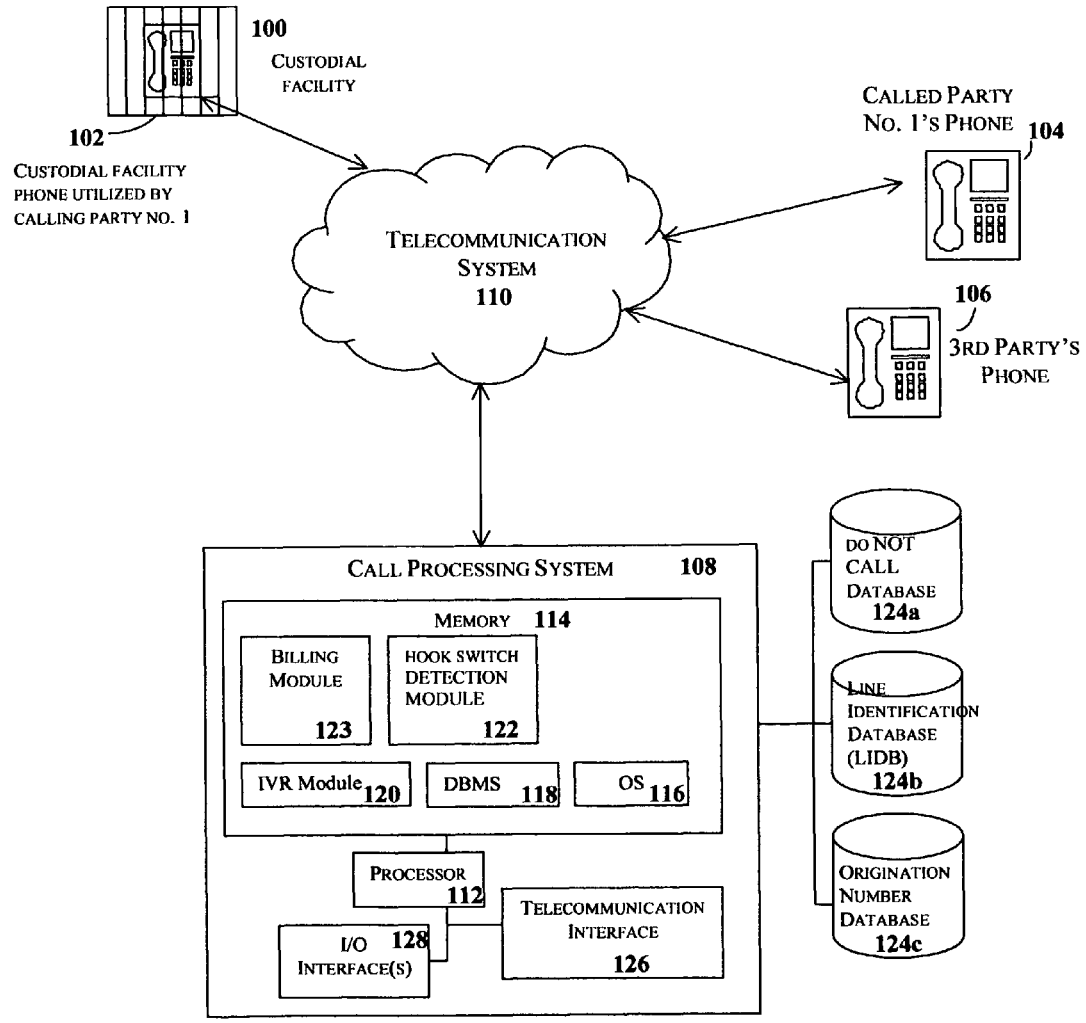
FIG. 1 is a block diagram illustrating an exemplary system in accordance with certain embodiments of the present invention.

The present invention provides specialized three-way calling during a collect call. A call processing system may be configured to selectively connect Calling Party No. 1 to a 3rd Party, via a collect call to Called Party No. 1 and a subsequent three-way call. If Called Party No. 1 accepts the collect call and attempts a three-way call, the call processing system may allow Called Party No. 1 to add 3rd Party to the collect call, if Called Party No. 1 agrees to pay an additional fee, and if 3rd Party's phone number is blocked from accepting a collect call. As an example, a service provider may query an appropriate Line Identification Database (LIDB) for performing billing validation to determine if a phone number is blocked from accepting a collect call. LIDB databases typically contain all billable directory number accounts maintained by a service provider. Service providers query LIDB databases prior to connecting a collect, third party, or calling card call to validate the dialed number (e.g., determine if it can receive collect calls), personal identification number (PIN), etc.. This and other methods to determine whether a phone number is blocked from accepting collect calls is well known by those skilled in the art and are not described further. The call processing center may also be configured to screen any number entered against a Do Not Call database to prevent the dialing of any phone number belonging to a person Calling Party No. 1 is not allowed to communicate with.

Although the following description of exemplary embodiments will be described in the context of an inmate (Calling Party No. 1) making a collect call, it should be understood that the invention may also be applicable to persons who are not in custody and whose access to, or use of a telephone is not restricted. Further, although the following description of exemplary embodiments will be described in the context of a "collect call", it should be understood that the invention applies to any call where Called Party No. 1 pays, or agrees to pay for the call. Therefore, the term "collect call" includes a promise to pay, such as payment via a traditional billed phone account, as well as payment by way of a debit card, debit account, prepaid account, prepaid calling card, and credit card.

The present invention may be used to establish a new revenue stream for participating service provider phone companies and/or custodial facilities. As an example, by selectively allowing three-way calling to add only those persons whose phones are blocked from accepting collect calls, a phone company will earn money from a communication that might not otherwise take place. Further, in a custodial environment, the screening of the 3rd Party's phone number against a Do Not Call database, or allowing only a group of pre-screened Called Party No. 1s (e.g. attorneys of a public defender/district attorney's office) to use the invention, will insure compliance with any court or administrative order.

The present invention may also be used to establish a new revenue stream for companies that sell "control boxes" that detect and prevent three-way calling. Heretofore, their market has been limited to custodial facilities. Service providers utilizing this invention in a non-custodial environment will desire to employ control box technologies to limit three-way calls originating from a collect call, to prevent any lost profits from a potential second collect call.

The present invention also provides benefits to friends and family members of inmates. Through use of the invention, these parties do not need to have a phone capable of accepting collect calls to speak to a friend or family member in custody if connected via a three-way call.

Exemplary embodiments of the present invention will hereinafter be described with reference to the figures, in which like numerals indicate like elements throughout the several drawings. FIG. 1 is a block diagram illustrating an exemplary operating environment for implementation of certain embodiments of the present invention. The exemplary operating environment includes a custodial facility 100 having at least one custodial facility phone 102 to be utilized by an inmate (Calling Party No. 1), at least two public or private telephones outside the custodial facility. One such phone 104 utilized by Called Party No. 1 (the person originally called collect by Calling Party No. 1) and the other outside phone 106 utilized by $3^{rd}$ Party, and a call processing system 108. A telecommunication system 110 connects the custodial facility phone 102, the outside phones 104 & 106 and the call processing system 108.

The telecommunication system 110 may be any public and/or private communication network. In certain embodiments, the telecommunication system 110 is the Public Switched Telephone Network (PSTN). The telecommunication system 110 may include wired and/or wireless segments and may carry digital and/or analog signals. In alternate embodiments, the telecommunication system 110 may take other forms, such as a voice over IP network or other type of data network. The various components and functionality of typical telecommunication systems 110 are well known in the art and are therefore not reiterated herein.

The custodial facility phone 102 and the outside phones 104 & 106 may be any traditional telephones or other communication devices that are configured to interact with a telecommunication system 110. For example the custodial facility phone 102 and the outside phones 104 & 106, may be Touch-Tone telephones, rotary telephones, cellular or mobile phones, and the like. In other embodiments, the custodial facility phone 102 and the outside phones 104 & 106 could be replaced or supplemented by other communication devices, such as personal computers, laptop computers, hand-held computers, personal digital assistants ("PDA"), pagers, etc., as may be appropriate.

The call processing system 108 is contemplated as being a processor-driven device or collection of devices that is configured for receiving and processing telephone calls. The call processing system 108 may further be configured for accessing and reading associated computer-readable media having stored thereon data and/or computer-executable instructions for implementing the various methods of the present invention. In particular, the call processing system 108 may be driven by a processor 112 for processing data and executing computer-executable instructions. The call processing system 108 also includes a memory 114, which may take the form of any computer-readable medium. The memory 114 may be logically and/or physically divided into multiple units.

The memory 114 stores data and program modules, such as, for example, an operating system ("OS") 116, a database management system ("DBMS") 118, an Interactive Voice Response ("IVR") module 120, a hook switch detection module ("control box") 122 and a billing module 123. These and/or other program may be executed by the call processing system 108 to perform the various methods of the present invention. By way of example, the IVR module 120 may provide functionality for responding to voice or other responses, such as Touch Tones, provided by a caller to the call processing system 108. The billing module 123 may provide functionality for generating bills for Called Party No. 1's phone 104, which may be charged an additional fee when a three-way call is established during a collect call to include both Calling Party No. 1's phone 102 and $3^{rd}$ Party's phone 106.

IVR functionality, control box functionality and billing functionality are well known in the art and are therefore not explained in detail herein. Those skilled in the art will appreciate that such functionality may be combined into fewer program modules or distributed among a greater number of modules than are illustrated in FIG. 1. In addition, such functionality may be distributed across multiple processor-driven devices, such as dedicated network servers, that collectively form the call processing system 108.

The call processing system 108 may include or be in communication with one or more databases. By way of illustration only, the call processing system 108 may be in communication with a Do Not Call database 124*a* for storing phone numbers that inmates are not allowed to call, an LIDB 124*b* to store billable directory number account information and inmate PINs, and an Origination Number Database 124*c* for storing a list of origination phone numbers authorized to access the call processing system 108. In certain embodiments, the Do Not Call Database 124*a* may be combined with the LIDB 124*b*.

These and/or other databases may of course also store any other data used or generated by the call processing system 108. Those skilled in the art will appreciate that the illustrated databases 124*a-c* may be physically and/or logically separate from one another. For security, the call processing system 108 may have a dedicated connection to the databases 124*a-c*, as shown. However, the call processing system 108 may also communicate with one or more of the databases 124*a-c* via the telecommunication system 110 or other network.

Telephone calls may be received at the call processing system 108 through a telecommunication interface 126. The telecommunication interface 126 may take the form of a telephony line card or other suitable hardware and/or software for connecting the call processing system 108 to the telecommunication system 110 and providing the logical connection between the call processing system 108, custodial facility phone(s) 102 and outside phones 104 & 106. The telecommunication interface 126 thus allows the caller (i.e., Calling Party No. 1, Called Party No. 1, and $3^{rd}$ Party) to interact with the call processing system 108 by providing voice commands or Touch-Tone commands that can be interpreted by the IVR module 120 and/or other program modules. The call processing system 108 may be configured with additional and/or other communication interfaces for providing logical connections to other types of communication devices and networks.

The call processing system 108 may also include input/output ("I/O") interface(s) 128 for providing logical connections to various I/O devices, such as a keyboard, a mouse, a microphone, a printer, a scanner, speakers, a display, etc. A system administrator may utilize these and other I/O devices to interact with the call processing system 108. For example, a system administrator may interact with the call processing system 108 to populate and edit the Origination Number Database 124*c*, store and delete phone numbers from the Do Not Call Database 124*a*, as well as store, delete and associate PINs of the LIDB 124*b* with the phone numbers in the Do Not Call Database 124*a*, alter the parameters for the IVR module 120, the hook switch detection module 122 and other program modules, etc. Those skilled in the art will appreciate that the call processing system 108 may include alternate and/or additional components, hardware or software.

Thus configured or similarly configured, the call processing system 108 may provide selective three-way calling for a collect call that originates from a custodial facility 100. The call processing system 108 may be programmed to receive calls from Calling Party No. 1 using a custodial facility phone 102. The call processing system 108, by way of the IVR module 120 for example, may identify the origination phone number of the custodial facility phone 102 and compare the origination phone number to a directory of participating or authorized custodial facilities stored in the origination number database 124*c*. If the origination phone number corresponds to a participating or authorized custodial facility 100, the Calling Party No. 1's call may be processed to allow the collect call to proceed. Otherwise the Calling Party No. 1 is notified that the "phone number dialed is not in service" or a similar notification is provided to the Calling Party No. 1 and the call is terminated.

If Calling Party No. 1's call is accepted for processing, the call processing system 108 may prompt Calling Party No. 1 to indicate whether instructions for using the service should be provided in English, Spanish or another available language option. For example, the IVR module 120 may prompt Calling Party No. 1 to press a key corresponding to a language selection or to say the name of the desired language. Other terms and conditions for use of the services provided by the call processing system 108 may be audibly presented to Calling Party No. 1, for example by the IVR module 120.

When Calling Party No. 1 accesses the call processing system 108 from an authorized or participating custodial facility 100 to place a collect call, Calling Party No. 1 may be prompted by the IVR module 120 to identify himself or herself (i.e. say name and/or enter PIN) and to input the phone number of Called Party No. 1's phone 104. The IVR module 120 may, in certain embodiments, place the call from the custodial facility phone 102 on hold and query the Do Not Call database 124*a* and any corresponding PIN in the LIDB 124*b* to verify that the call is allowed, before dialing Called Party No. 1's phone 104. If the call is allowed, the call processing system 108 will dial the number input.

If Called Party No. 1's phone 104 is answered, the call processing system 108 will advise Called Party No. 1 that, in addition to the service provider's usual admonition(s), an additional fee will be charged for a three-way call established during the collect call, and instructions on how to make a three-way call during the collect call. If Called Party No. 1 accepts terms, the call processing system 108 may connect Calling Party No. 1's phone 102 to Called Party No. 1's phone 104. Called Party No. 1 bears all additional costs for communicating with Calling Party No. 1. Other methods for connecting the Calling Party No. 1 utilizing a custodial facility phone 102 to Called Party No. 1's phone 104 are known in the art and are contemplated herein. In the preferred embodiments, all payment processing and verification services involving the Called Party No. 1's phone 104 are handled by the telecommunication system 110, for example by a participating telephone company.

Those skilled in the art will appreciate that the operating environment shown in and described with respect to FIG. 1 is provided by way of example only. Numerous other operating environments, system architectures and device configurations are possible. For example, the call processing system 108 may in certain embodiments be implemented at or within the custodial facility 100. In other embodiments, various components of the PSTN may be adapted for performing the functionally described with respect to the present invention. Accordingly, the present invention should not be construed as being limited to any particular operating environment, system architecture or device configuration.

Figure 2A:
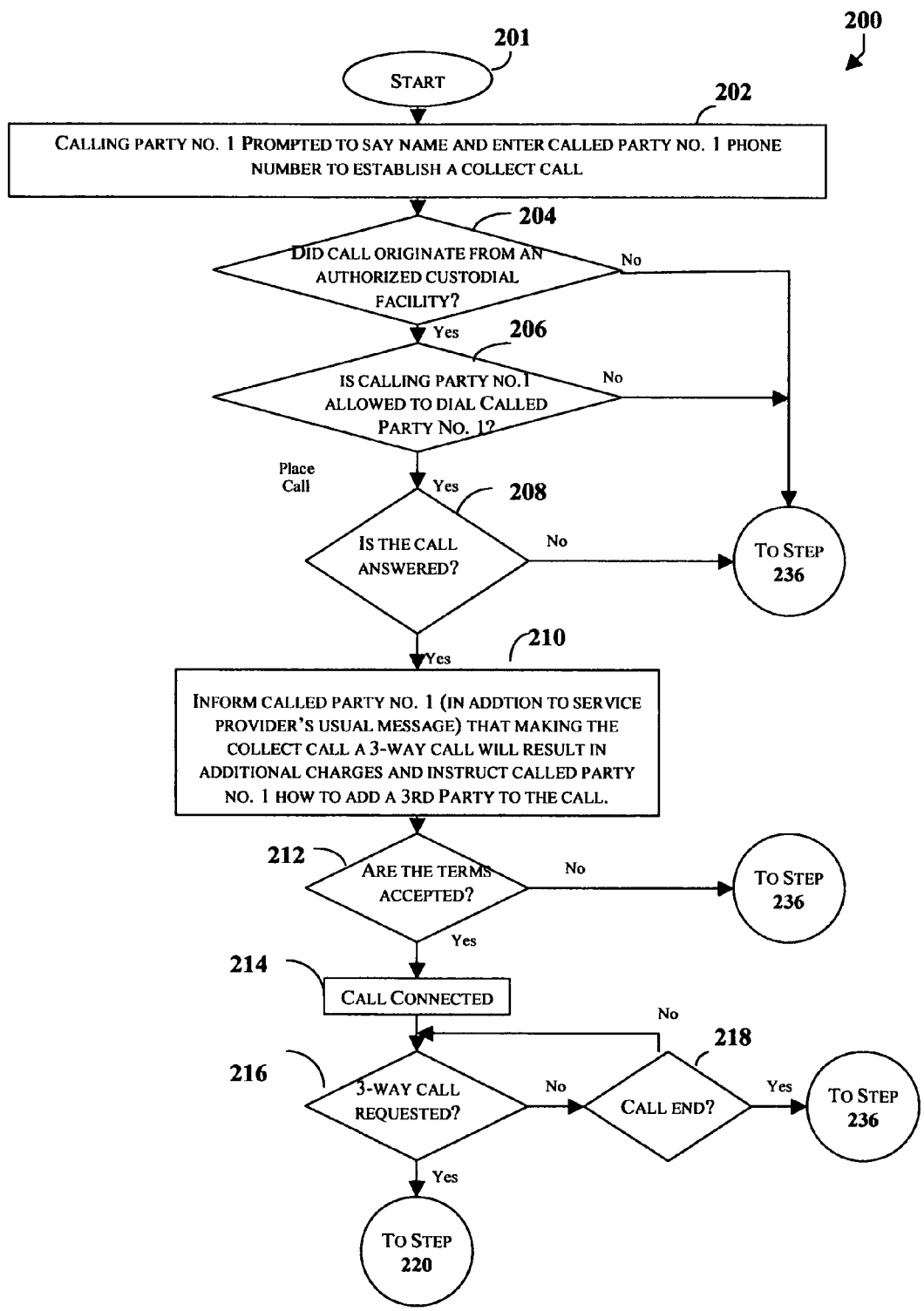
FIG. 2A and FIG. 2B, is a flow diagram illustrating an exemplary method for processing a call placed by Calling Party No. 1 from a custodial facility in accordance with certain embodiments of the present invention.
Figure 2B:
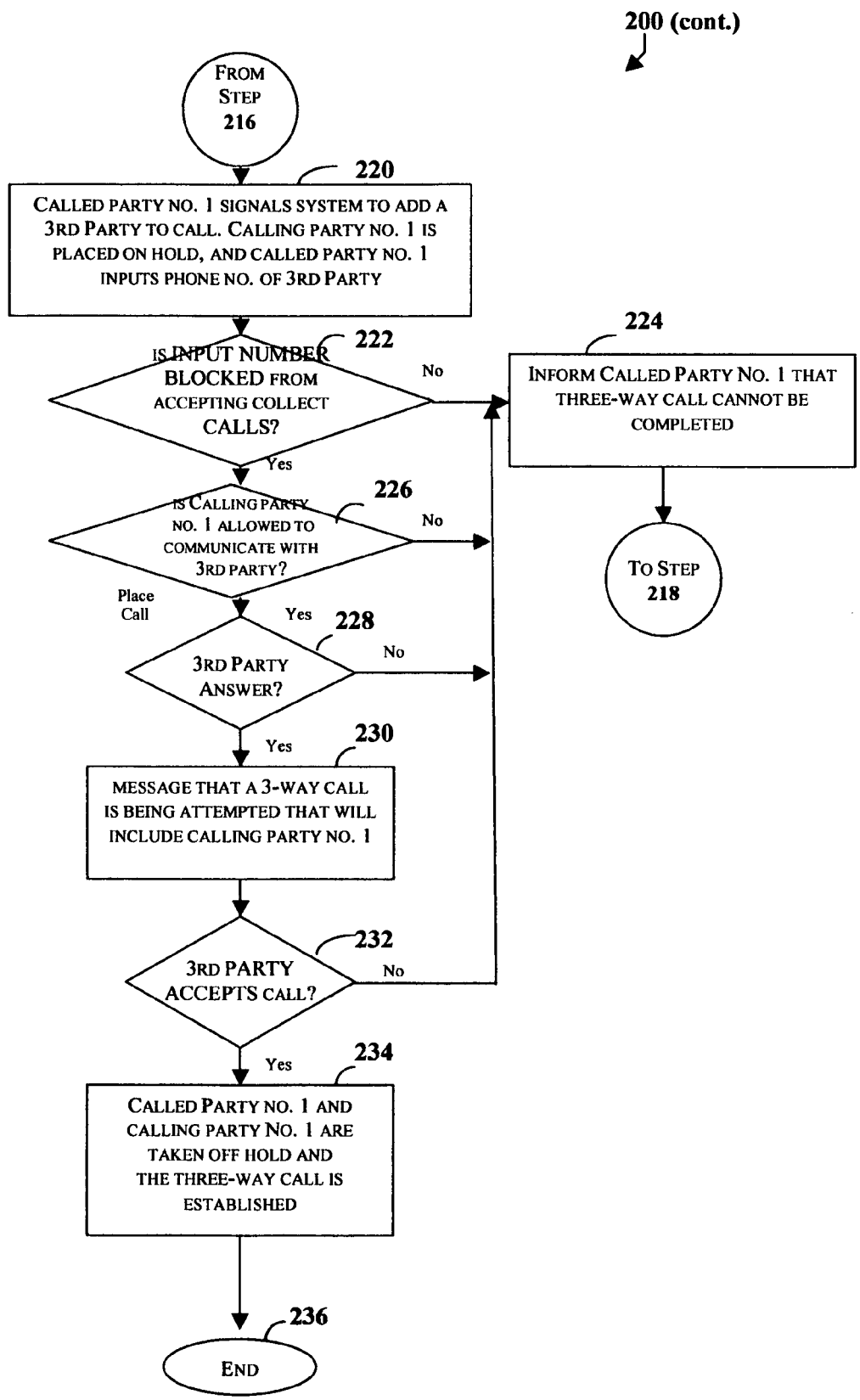

FIG. 2, comprising FIG. 2A and FIG. 2B, is a flow diagram illustrating an exemplary method for processing a three-way call during a collect call placed by an inmate (Calling Party No. 1) using a custodial facility phone 102, in accordance with certain embodiments of the invention. With reference to FIG. 2A, the method begins at starting block 201 and progresses to step 202, where Calling Party No. 1 initiates a collect call using the custodial facility phone 102. Further, the call processing system 108 may prompt Calling Party No. 1 user of the custodial facility phone 102 to say his name, enter his PIN and input the phone number of Called Party No. 1's phone 104.

Next at step 204, the call processing system 108 determines whether the call originated from an authorized custodial facility 100. A list of authorized custodial facilities 100 and their corresponding origination phone numbers may be stored, for example, in an origination number database 124c. An authorized custodial facility 100 is one that has agreed to participate in the services offered by the call processing system 108. Thus, as an incoming call is received by the call processing center 108, the origination phone number may be identified and the Origination Number Database 124c may be interrogated based on the origination phone number. If the incoming call cannot be verified as originating from an authorized custodial facility 100, the exemplary method ends at step 236.

In certain embodiments, any call placed from a custodial facility 100 may be accepted by the call processing system 108. In such embodiments, the call processing system 108 must be configured to determine whether the call originated from a custodial facility 100. Again, an origination number database 124c may be interrogated to determine if the origination phone number is recognized as being assigned to a custodial facility 100. If the origination number cannot be identified, the call processing system 108 may attempt to verify the call is from a custodial facility 100. If the incoming call cannot be identified through automated processes, the call may be transferred to a live operator, who may listen for an automated identification message and/or pursue other means to attempt to verify that the call is from a custodial facility 100. If the call cannot be verified as originating from a custodial facility 100, the call may be dropped and the exemplary method ends at step 236.

If the incoming call is verified to have originated from an authorized custodial facility 100, the method proceeds to step 206, where a determination is made whether the phone number entered by Calling Party No. 1 utilizing the custodial facility phone 102 is allowed to dial Called Party No. 1's phone 104. This may include the call processing system 108 querying the LIDB 124b to verify that the PIN is valid and the destination number entered is not in the Do Not Call Database 124a for the entered PIN. A list of unauthorized phone numbers for certain PIN's may be stored for example, in a Do Not Call database 124a. An unauthorized phone number is one that Calling Party No. 1 may not dial directly, or indirectly. Thus, an entered number may be identified and the Do Not Call database 124a may be interrogated based on the PIN entered. If the PIN cannot be verified, or is associated with a phone number in the Do Not Call database 124a, the exemplary method ends at step 236. In other embodiments, instead of, or in addition to a Do Not Call database 124a, a database with phone numbers that a caller may exclusively dial could be queried by the call processing system 108, and if the phone number entered is not associated with the PIN entered, the exemplary method ends at step 236.

If the collect call is verified to have originated from an authorized custodial facility 100, and the caller is allowed to dial the number entered, then at step 206, the phone 102 used by Calling Party No. 1 is placed on hold and Called Party No. 1's phone 104 is dialed. The method proceeds to step 208, where a determination is made as to whether the collect call is answered. If the call is not answered, the exemplary method ends at step 236. If the collect call is answered, the method proceeds to step 210, where the call processing system 108 may inform Called Party No. 1, (in addition to the service provider's usual message, "this is a call from a penal institution, etc.") that the making of a three-way call during the collect call will result in additional charges to Called Party No. 1's phone 104, instruct Called Party No. 1 how to add a $3^{rd}$ party phone 106 to the collect call, and may provide information on how to acquire more information on costs before accepting the collect call.

After any and all terms and conditions are audibly presented via the phone 104 utilized by Called Party No. 1, a determination is made at step 212 as to whether Called Party No. 1 accepts those terms and conditions. Ways to accept terms of collect calls are well known in the art and will not be described herein. If Called Party No. 1 does not accept the terms of the collect call, the call is immediately terminated and the exemplary method ends at step 236. If the terms of the collect call are accepted at step 212, the method advances to step 214 where the call is connected. Those skilled in the art will appreciate that many techniques may be used for connecting the custodial facility phone 102 utilized by Calling Party No. 1, to Called Party No. 1's phone 104. As an example, call bridging, call forwarding and teleconferencing techniques could all be employed.

Proceeding to step 216, the call processing system 108 determines whether a request to establish a three-way call is made during the collect call. The request can be detected, for example, by the hook switch detection module (control box) 122 of the call processing system 108. The functionality of control boxes is well known in the art and is not discussed further herein. If no such request is made during the collect call, the call will continue until it is determined that the call has ended at step 218, where the exemplary method then ends at step 236. The call will continue to be monitored 216 for a three-way call request until the call ends at step 236. If during the collect call, a three-way call is requested, the method proceeds to step 220. Three-way calling is well known in the art and is not described herein.

Referring now to FIG. 2B, the custodial facility phone 102 utilized by Calling Party No. 1 at step 220 is placed on hold, and Called Party No. 1 inputs the phone number of 3rd Party's phone 106 to add to the collect call in progress. In some embodiments, prior to the call processing system 108 attempting to make a three-way call, Called Party No. 1 could be advised again, or for the first time, that additional fees will apply for the establishing a three-way call during the collect call, and (if the call originated from a custodial facility 100) any prohibition against knowingly assisting another to violate a court order, and be given the opportunity to affirmatively accept the terms of any three-way call. If Called Party No. 1 does not accept the terms, the method may return to step 218 where Called Party No. 1 is reconnected to the collect call with Calling Party No. 1 utilizing the custodial facility phone 102. The call will continue to be monitored for a three-way call request until it is determined that the call has ended at step 218, where the exemplary method then ends at step 236.

Once Called Party No. 1 enters the phone number of 3rd Party's phone 106, the call processing system 108 may place Called Party No. 1's phone 104 on hold and proceed to step 222 and query the LIDB 124b to determine whether the input phone number is blocked from accepting a collect call. If the phone 106 of $3^{rd}$ Party is not blocked, the method proceeds to step 224 where Called Party No. 1 is informed that the call cannot be completed, and the method may return to step 218 where Called Party No. 1 is reconnected to the collect call with Calling Party No. 1 utilizing the custodial facility phone 102. The call will continue to be monitored for a three-way call request until it is determined that the call has ended at step 218, where the exemplary method then ends at step 236.

If it is determined that the input phone number is blocked from accepting a collect call, the method proceeds to step 226 where the Do Not Call database 124a and LIBD 124b are queried to determine if Calling Party No. 1 is not allowed to dial 3rd Party's phone 106. If it is determined that Calling Party is not allowed to dial the input phone number for 3rd Party's Phone 106 the method proceeds to step 224 where Called Party No. 1 is informed that the call cannot be completed and the method may return to step 218 where Called Party No. 1 is reconnected to the collect call. The call will continue to be monitored for a three-way call request until it is determined that the call has ended at step 218, where the exemplary method then ends at step 236. In some embodiments, an additional warning may be played to both the custodial facility phone 102 and Called Party No. 1's phone 104 that Calling Party No. 1 may have his calling privileges suspended if calling 3rd Party's phone 106 is attempted again. If it is determined at step 226 that Calling Party No. 1 is not prohibited from dialing the phone number input on Called Party No. 1's phone 104, the call processing center 108 will dial the number.

The method then proceeds to step 228 where the call processing center 108 determines if the call is answered. If the call is not answered, the method proceeds to step 224 where Called Party No. 1 is informed that the call cannot be completed and the method returns to step 218 where the collect call is re-established. The call will continue to be monitored for a three-way call request until it is determined that the call has ended at step 218, where the exemplary method then ends at step 236.

If the call is answered, the method proceeds to step 230 where a message is played to 3rd Party's phone 106, advising that a three-way call is being attempted that will include Calling Party No. 1 calling from a custodial facility phone 102. This could be done by replaying the name and message (less information regarding billing) presented to Called Party No. 1 during the collect call set up.

The method then proceeds to step 232 where the call processing center 108 determines if 3rd Party affirmatively accepts to be included in a three-way call that will include Calling Party No. 1, utilizing a custodial facility phone 102. This may be done by prompting the 3rd Party to say "yes", press "0", etc. Accepting the terms of a call is well known by those skilled in the art and is not discussed further. If 3rd Party does not accept, or rejects, being added to a three-way call that will include Calling Party No. 1, the method proceeds to step 224 where Called Party No. 1 is informed that the call cannot be completed. The method may return to step 218 where Called Party No. 1 is reconnected to the collect call with Calling Party No. 1 utilizing the custodial facility phone 102. The call will continue to be monitored for a three-way call request until it is determined that the call has ended at step 218, where the exemplary method then ends at step 236.

If 3rd Party accepts being added to a three-way call that will include Calling Party No. 1, the method proceeds to step 234 where the custodial facility phone 102 utilized by Calling Party No. 1 and the phone 104 utilized by Called Party No. 1 are taken off hold and the three-way call is connected to include the phone 106 utilized by 3rd Party. The exemplary method then ends at Step 236, where the collect call continues until Called Party No. 1 hangs up his phone 104, or any system administrator limiting call parameter is triggered (e.g. maximum call length reached, lights out, etc.) which terminates the call, and the exemplary method ends at step 236.

As may be seen from the foregoing, the present invention provides systems and methods for providing selective three-way calling during a collect call services for inmates and their families and friends. It should be appreciated that the exemplary aspects and features of the present invention as described above are not intended to be interpreted as required or essential elements of the invention, unless explicitly stated as such. It should also be appreciated that the foregoing description of exemplary embodiments was provided by way of illustration only and that many other modifications, features, embodiments and operating environments are possible. Accordingly, the scope of the present invention should be limited only by the claims to follow.

I claim:

1. A system for processing a collect call, comprising:
   means for prompting a person making a collect call, to input a phone number;
   means for placing the collect call to a called party using the phone number input;
   if the call is answered, means for presenting terms for accepting the collect call, which include the called party agreeing to pay an additional fee for any three-way call established during the collect call;
   means for prompting the called party to accept or reject the terms presented;
   means for connecting the call, if the called party accepts the terms; and
   means for terminating the call, if the call is not answered, or if the terms presented are not accepted.

2. The system of claim 1, further comprising:
   means for determining whether the origination number of the phone from which the collect call is placed is associated with a custodial facility;
   means for further determining if the origination number is associated with an authorized custodial facility, if the origination number is associated with a custodial facility;
   means for terminating the call prior to dialing the number input for the collect call, if the origination number is associated with a custodial facility, but not associated with an authorized custodial facility; and
   means for dialing the number input for the collect call, if the origination number is associated with an authorized custodial facility, or is not associated with a custodial facility.

3. A computer-readable medium having stored thereon computer-executable instructions for performing the method of claim 2.

4. The system of claim 2, further comprising:
   means for prompting the calling party to input a personal identification number (PIN), if the origination number is associated with an authorized custodial facility;
   means for determining if the PIN is valid;
   means for further determining if the PIN disallows the calling party from attempting to dial the phone number input, if the PIN is valid; and
   means for terminating the call prior to dialing the phone number input, if the PIN is invalid, or if the PIN disallows the calling party from attempting to dial the phone number input.

5. A computer-readable medium having stored thereon computer-executable instructions for performing the method of claim 4.

6. The system of claim 4, where the PIN is assigned to the calling party by the custodial facility or a phone service provider.

7. The system of claim 1, further comprising:
   means for determining whether the called party signals that the called party is attempting to establish a three-way call;
   means for determining a phone number input by the called party for the three-way call;
   means for determining whether the input phone number is blocked from accepting collect calls;

means for allowing the input phone number to be dialed, if the phone number input is blocked from accepting collect calls; and means for advising the called party of the original collect call that the number is not eligible for three-way calling, and reconnect the original collect call without dialing the number input for the three-way call, if the phone number input is not blocked from accepting collect calls.

* * * * *